(No Model.)
J. CORELL.
STEAM TRAP.
No. 332,997. Patented Dec. 22, 1885.
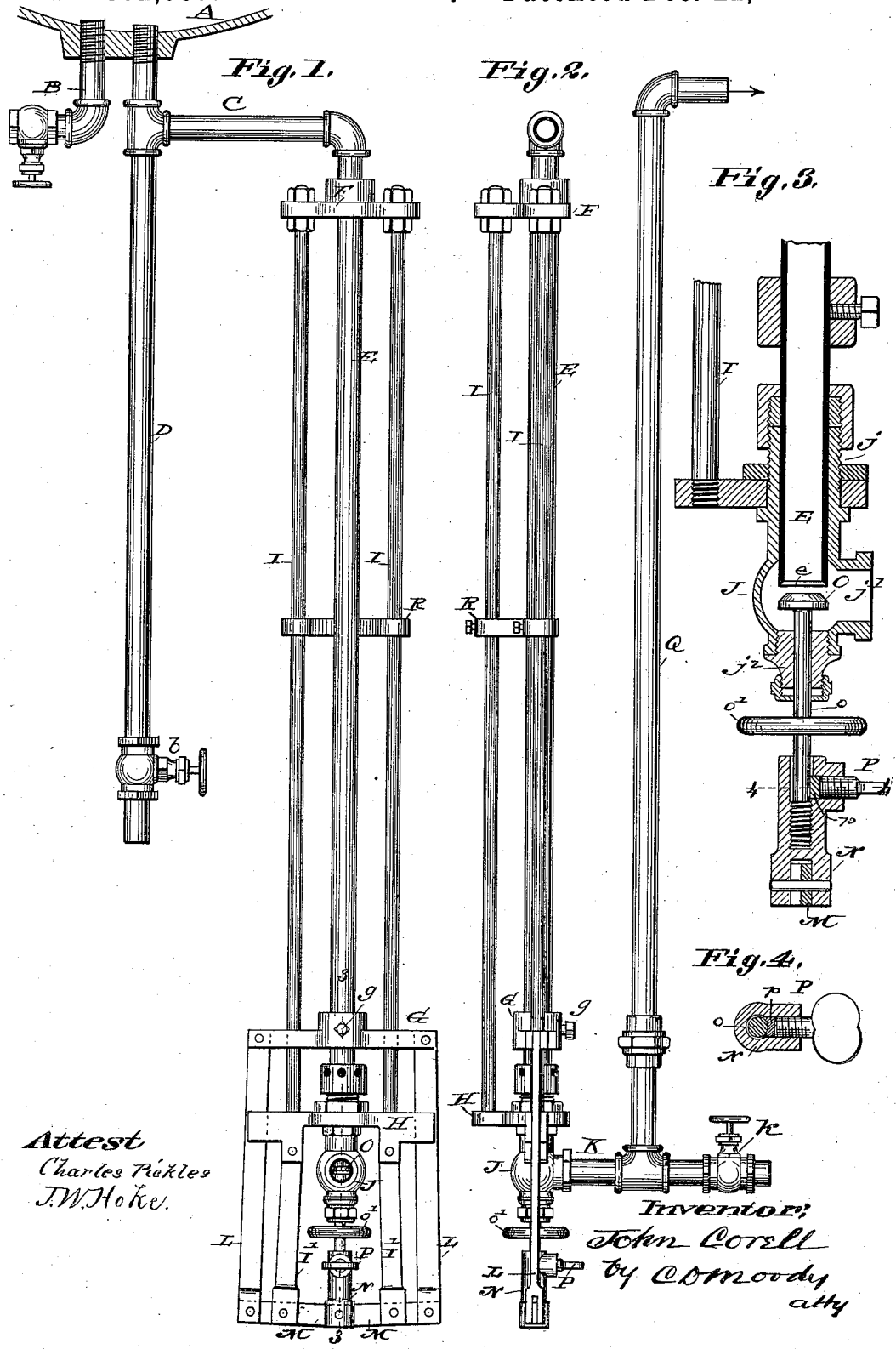
Attest
Charles Pickles
J. W. Hoke.
Inventor:
John Corell
by C. D. Moody
atty

UNITED STATES PATENT OFFICE.

JOHN CORELL, OF ST. LOUIS, MISSOURI.

STEAM-TRAP.

SPECIFICATION forming part of Letters Patent No. 332,997, dated December 22, 1885.

Application filed March 5, 1885. Serial No. 157,801. (No model.)

*To all whom it may concern:*

Be it known that I, JOHN CORELL, of St. Louis, Missouri, have made a new and useful Improvement in Steam-Traps, of which the following is a full, clear, and exact description.

The improvement relates to that class of steam-traps termed "expansion steam-traps."

The principal features of the improvement are the settling-chamber, the free movement of the steam-tube and valve-seat in the valve-chamber, the mode of adjusting the valve, the construction of the ties which connect the cross-bar at the fixed end of the steam-tube with the levers that move the valve, the testing tube and valve, and the means for stiffening the ties. The annexed drawings, making part of this specification, exhibit the most approved form of carrying out the improvement.

Figure 1 is a side elevation of the trap. Fig. 2 is an elevation at right angles to that of Fig. 1. Fig. 3 is a longitudinal section, upon an enlarged scale, on the line 3 3 of Fig. 2, and Fig. 4 is a section on the line 4 4 of Fig. 3.

The same letters of reference denote the same parts.

A represents any apparatus with which a steam-trap of the kind under consideration is adapted to be used.

B represents the pipe through which the steam is supplied to the apparatus.

C represents the pipe through which the steam and condensed water pass from the apparatus to the trap, Figs. 1, 2.

D represents the settling-chamber. It is preferably in the form of a tube. At its upper end it connects with the pipe C, and it is furnished with the valve $b$, to enable the settlings to be blown off from the chamber as desired.

E represents the steam-tube of the trap. The pipe C connects with it. The cross-plate F is fastened to the tube E at the upper end thereof.

G represents a cross-plate fastened by means of the set-screw $g$ to the tube E, toward the lower end thereof.

H represents another cross-plate. It is connected with the cross-plate F by means of the rods I I I. The valve-chamber J is fastened to the cross plate H, so that the valve-chamber, by means of the cross-plate H and the rods I I I, is prevented from moving. The tube E at its lower end works freely through the valve-chamber, the mode of connecting the tube and the valve-chamber being shown more distinctly in Fig. 3—that is, the tube works through a stuffing-box, $j$, upon the valve-chamber as the tube is elongated and shortened in the working of the trap. The outlet $j'$, through which the condensed water is discharged, and to which outlet the tube K is attached, therefore does not change its position.

L L represent the arms, which at their upper ends are jointed to the cross-plate G and at their lower ends to the levers M M. These levers at their inner ends are jointed to the valve-stem holder N, and between their points of connection with the arms L L and the valve-stem holder the levers are each connected with the lower cross-plate, H. This connection I' is a jointed one, the advantage of which being that the levers M M and valve-stem holder are thereby more readily moved and the valve made more sensitive.

O represents the valve. Its stem $o$ works through the plug $j^2$ in the lower end of the valve-chamber, and at its lower end the stem is secured in the valve-stem holder N. The valve seats at $e$ in the lower end of the tube E. The valve can be readily adjusted to work at any desired pressure by means of the handle $o'$, which is attached to the valve-stem. By suitably rotating the handle the valve-stem can be screwed upward and downward in the holder N, and when adjusted it can be fastened by means of the binding-screw P, which works through the side of the holder, and whose point bears against the plate $p$, Figs. 3, 4, which in turn bears against the valve-stem.

In the operation of the trap the tube E lengthens and shortens in the customary manner, and its movement is imparted to the valve by means of the cross-plate G, the arms L L, the levers M M, and the holder N.

In adjusting the trap the testing-valve $k$ in the tube K is opened and then the trap-valve O is opened. The water from the vessel A is then allowed to flow through the trap and the tube K until both steam and water issue from the tube K, whereupon the tube E becomes hotter. The valve O is then gradually closed until water only passes the valve, which now being adjusted is fastened by means of the binding-screw P. Then when steam comes the tube E heats and lengthens and closes the valve O, and when the water has collected again the tube E shortens and the valve O unseats again. The water passing through the trap can be uplifted through the tube Q, in which case the valve k is closed.

The present trap is well adapted for raising water, for, owing to the tube E being made to work freely through the valve-chamber, the weight of the tube Q and its contents does not cramp or impede the tube in its movement.

The jointing of the arms I' I' to the cross-plate G is advantageous in this respect: If the arms extended to the cross-plate at the upper end of the trap, they would spring in practice sufficiently to interfere with the proper working of the levers M M.

The ties I I I are stiffened by means of the plate R. This plate may be termed a "saddle," as it bears against the tube E. The ties I I I pass through the plate, and they may be secured therein by means of set-screws.

I claim—

1. In combination with the vessel A and the steam-trap, the settling-chamber D, said settling-chamber being between said vessel and said steam-trap, substantially as described.

2. The combination of the tube E, the cross-plates F G H, the ties I I I, the arms L L, the rods I' I', the levers M M, and the holder N, substantially as described.

3. In a steam-trap the combination of the tube E, the valve-chamber J, the tube K, and the tube Q, said tube working freely in said valve-chamber, as and for the purpose described.

Witness my hand.

JOHN CORELL.

Witnesses:
C. D. MOODY,
J. W. HOKE.